United States Patent [19]

Koenig et al.

[11] Patent Number: 5,568,789
[45] Date of Patent: Oct. 29, 1996

[54] SQUIRREL-RESISTANT BIRD FEEDER

[76] Inventors: Eldo C. Koenig, 35005 Fairview Rd., Oconomowoc, Wis. 53066; Evan F. Koenig, 9022 Church Rd., Dallas, Tex. 75231

[21] Appl. No.: 444,552

[22] Filed: May 19, 1995

[51] Int. Cl.[6] .................................................. A01K 39/01
[52] U.S. Cl. .......................................................... 119/57.9
[58] Field of Search ................................... 119/52.3, 52.2, 119/57.8, 57.9

[56] References Cited

U.S. PATENT DOCUMENTS

| | | | |
|---|---|---|---|
| 2,705,938 | 4/1955 | Greenough | 119/52.3 |
| 2,891,508 | 6/1959 | Bower | 119/52.3 |
| 3,117,554 | 1/1964 | Taylor | 119/57.9 X |
| 3,136,296 | 6/1964 | Luin | 119/52.2 |
| 4,829,934 | 5/1989 | Blasbalg | 119/57.8 |
| 4,955,319 | 9/1990 | Brucker | 119/52.2 |
| 5,033,411 | 7/1991 | Brucker | 119/52.2 |
| 5,355,835 | 10/1994 | Freed | 119/57.9 |
| 5,435,268 | 7/1995 | Liethen | 119/57.8 |

*Primary Examiner*—Robert P. Swiatek
*Assistant Examiner*—Yvonne R. Abbott
*Attorney, Agent, or Firm*—Keith Schoff, Attorney

[57] ABSTRACT

A hanging or fixedly suspended bird feeder embodies an upright, tubular, smooth-walled, feed container configured with feed ports in which at least lower portions of the lips of the ports are recessed radially inward from the side wall of the container into the base edge for the purpose of deterring marauding squirrels from obtaining a claw hold on the container wall. A saucer-shaped perch extends radially from beneath the feed container, suspended by elastic cord which yields and stretches under weight of a squirrel, thwarting attempts by squirrels to feed by upsetting the perch thereby ejecting the creatures to the ground.

5 Claims, 2 Drawing Sheets

SQUIRREL-RESISTANT BIRD FEEDER

FIELD OF ART

Feeders for small wild birds are hung or mounted outdoors at locations where occupants of a building can enjoy watching the birds feed.

BACKGROUND OF THE INVENTION

Transparent rigid tubing which is closed at the bottom and fitted with a removable cap for filling is commonly used for feeding birds. Ports in the tube wall provide birds with access to the feed, often seeds, and perches are provided on which birds can alight during feeding. A tray can be provided under the tube to catch feed which drops during feeding activity.

SUMMARY OF THE INVENTION

Bird feeders attract not only birds, but other species as well, such as squirrels, which can descend from an overhanging branch or eave from which the feeder is hung, or leap several feet from an adjacent structure to gain access to feed. To deter use by squirrels, the feeder of this invention is configured with at least the lower lip portions of feed ports recessed from the side wall of the feeder to deprive squirrels of an edge on which to gain a claw hold. The lower lips of feed ports are located in the bottom or base edge portion of the smooth tubular body of a feeder, recessed from the outermost periphery, where they are not available for being snagged by a claw of a squirrel which attempts to cling to the outside of a feeder wall. A tray perch is supported beneath the feeder body by an elastic band tensioned to sustain only a few ounces of weight before the tray will upset and eject a creature to the ground.

The use of an elastic band for supporting the tray eliminates the need for isolating the band in the feed chamber, as would be necessary if a coil spring were to be used.

The feeder is universally adapted for use with various sizes of seed and other type foods when a rotatable insert is placed in the bottom of the feed chamber for restricting or enlarging the opening size of the feed ports. The feeder's minimal number of components and versatility for use in dispensing various types and sizes of feeds distinguish it from squirrel resistant feeders heretofore known. Further, the feeder has the attribute of being squirrel resistant even in close proximity to trees or structures, or if constructed of materials, such as some plastics. on which a squirrel might otherwise chew, because the structural configuration inhibits the ablity of a squirrel to secure a foothold on the outside of the structure.

DESCRIPTION OF THE INVENTION

Figure 1:
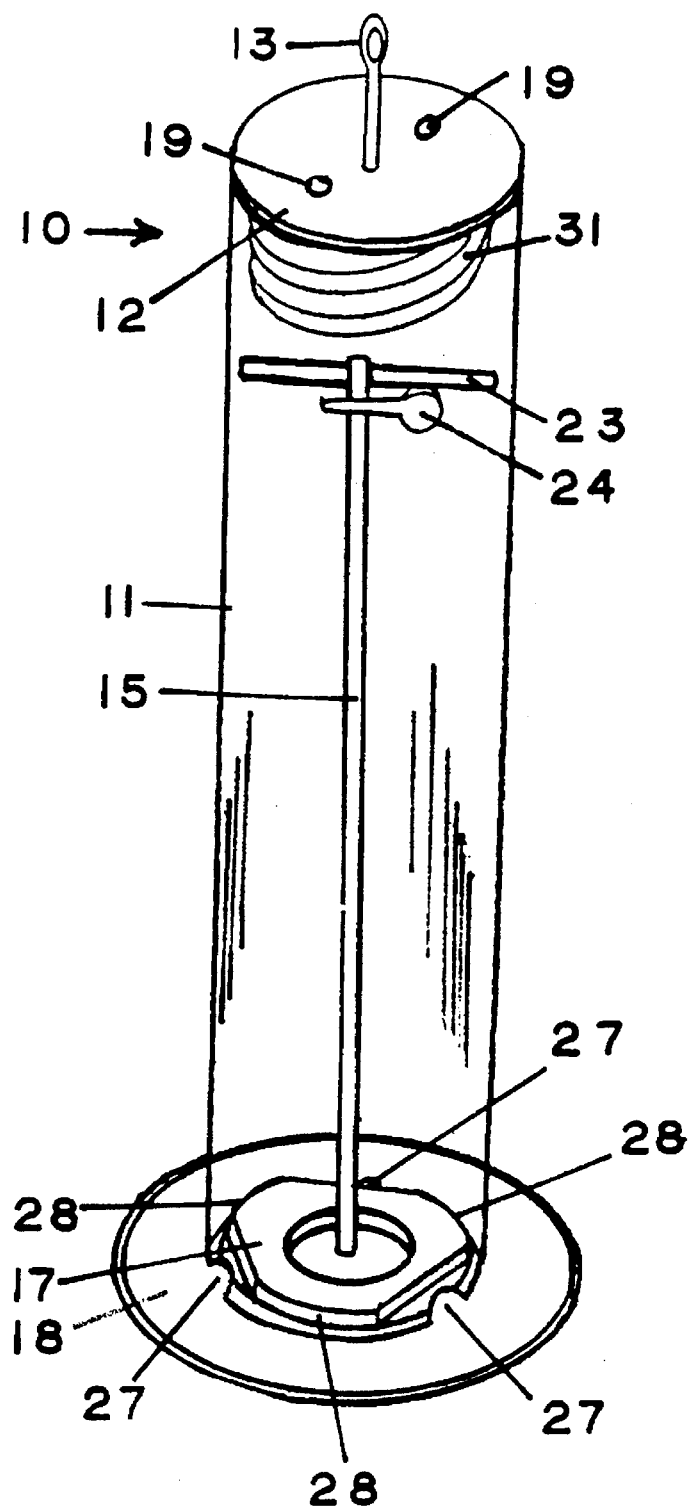
FIG. 1 is a perspective view of a preferred embodiment of the invention.

In the figures, bird feeder 10 comprises tubular feed chamber 11 fitted with cap 12 by threaded engagement. To make visible the level of feed in the container, glass or plastic may be used for chamber 11, or other suitable materials may be used if transparency is not desired. Ring 13 is removably affixed to cap 12 to facilitate suspending of feeder 10 by a cord or wire. Cap 12 is provided with openings 19 for enabling mounting screws to be used for mounting the feeder fixedly on an eave soffit or other overhead support. Elastic cord 15 within feed chamber 11 is supported at the top from rod 23, and passes downward through opening 16 in the center of insert 17 and through an opening in the the bottom wall of feed chamber 11, and further through a drain opening in the center of tray 18, under which it is looped through the center of ring 33. Tray 18 is preferably saucer-shaped with a slightly upturned peripheral portion extending radially beyond the wall of feed chamber 11 for retaining seeds which drop during feeding activity by birds at the feeder. Elastic cord 15, in the embodiment shown in FIG. 1, can be tensioned to a desired setting by adjusting the position at which it is clamped around rod 23 within feed chamber 11. Lesser resistance to elongation of cord 15 is provided if it is desired that only smaller size wild birds be able to feed at the feeder, and greater resistance if larger birds as well are desired. Any setting of elastic cord 15 which is suitable for feeding by any wild song bird will be greatly less than that which would be sufficient to support tray 18 in the horizontal position shown if a squirrel or other creature of comparable weight were to light on the edge of the tray. Under the greater weight of such a creature, cord 15 would stretch to a length which would tip tray 18 to a vertical position and cause the creature to be ejected from the feeder to the ground. To assure that a claw hold cannot be gained on tray 18 when it is upset, the tray surface is preferably smooth and of hard composition without ridges or lips. Steel or glass compositions are preferred materials of construction for the tray with other durable metal, ceramic, or suitable synthetic resin compositions being usable. If container 11 is transparent for enabling content level to be monitored by casual viewing, acrylic or polycarbonate resins are preferred materials of construction in addition to glass. If transparency is not required, wood, ceramic, or opaque synthetic resins are suitable materials, as for example, polyvinylchloride piping components as used in building construction. For a feeder suspended by a cord, container 11 is preferably not less than about four inches in diameter and twenty inches in length as a deterrent to squirrels attempting to cling to the wall of a feeder while trying to reach feed ports. For feeders suspended by fixed mounting from a ceiling or soffit, a container length of five or six inches is sufficient. When container 11 has a diameter of not more than about five inches, two feed ports 27 are preferably provided, and when of greater diameter, three ports as shown, or more may be provided. Tray 18 is preferably about three or four inches greater in diameter than container 11. Elastic cord 15 may comprise any suitable elastomeric composition, but one which exhibits good resistance to degradation by sunlight, such as EPDM rubber, is preferred. In addition, the cord must maintain resiliency throughout the range of ambient outdoor temperatures at locations where the feeder is to be used. The elastic constant of cord 15 is preferably equal to not less than about one-fourth of the weight of a squirrel per inch of displacement at the bottom reach of the cord under tray 18. A suitable tension setting of cord 15 can be obtained by trial-and-error adjustment of the location along cord 15 where it is retained by alligator clip 24 to diametrically extending rod 23 within container 11 as shown in FIG. 1. Alternatively, cord 15' of FIG. 2, which is configured as a continuous band, may have either a single thickness of the band passed through slot 33' in ring 33 for engaging the ring or have a bight of the band looped through the ring, with the remainder of the band being run through the eye fromed by the bight to secure it to the ring. Rod 23 may be similarly engaged with band 15' in either manner. A short metal rod may be substituted for ring 33, if desired. To decrease the tension setting of band 15', suitable hanger such as a paper clip or similar spacer, not shown, may be inserted between rod 23 and band 15'. To increase tension, band 15' may be twisted either before or after connections are made to effectively shorten the relaxation length of the band.

Insert 17 received in the bottom container 11 is shown to comprise three equi-peripherally spaced contact areas 28, separated one from the next by chord sections 29, which as shown, have faces which slope upwardly inward about forty-five degrees from vertical, but such sloped face configuration is not necessary for utility. Manual rotation of insert 17 may be made either through the top of container 11 or through feed ports 27 to provide continously variable adjustment of the effective opening size of feed ports 27 from that of being fully closed when contact areas 28 cover the ports to that of being fully open when the contact areas are located equidistant between adjacent ports. Port opening size is selectively set according to the type and size of feed to be dispensed from container 11. Insert 17 may constitute any suitable material with a hard plastic material being preferred.

Feed ports 27 are preferably about one-half inch diameter circular openings axially angled in radial planes at about forty-five degrees to bisect the angle between the wall and the bottom of container 11. The bottom edge of container 11 is preferably configured with a radius of curvature approximately equal to the radius of the openings of port 27 with at least the lower portions of the port openings being radially recessed into the bottom wall of container 11 sufficiently to prevent a squirrel from gaining a claw hold on the container wall if it descends over the outside of the feeder. Alternatively, the bottom edge of container 11 may be of beveled configuration rather than curved. Ports 27 may be of any configuration which is effective in recessing at least the lower half of the lip away from the outer wall surface of container 11. It is preferred to maintain at least the upper portion of the lip of a feed port 27 accessible through the side wall to accomodate pecking by feeding birds through the ports for obtaining access to feed within container 11.

Figure 2:
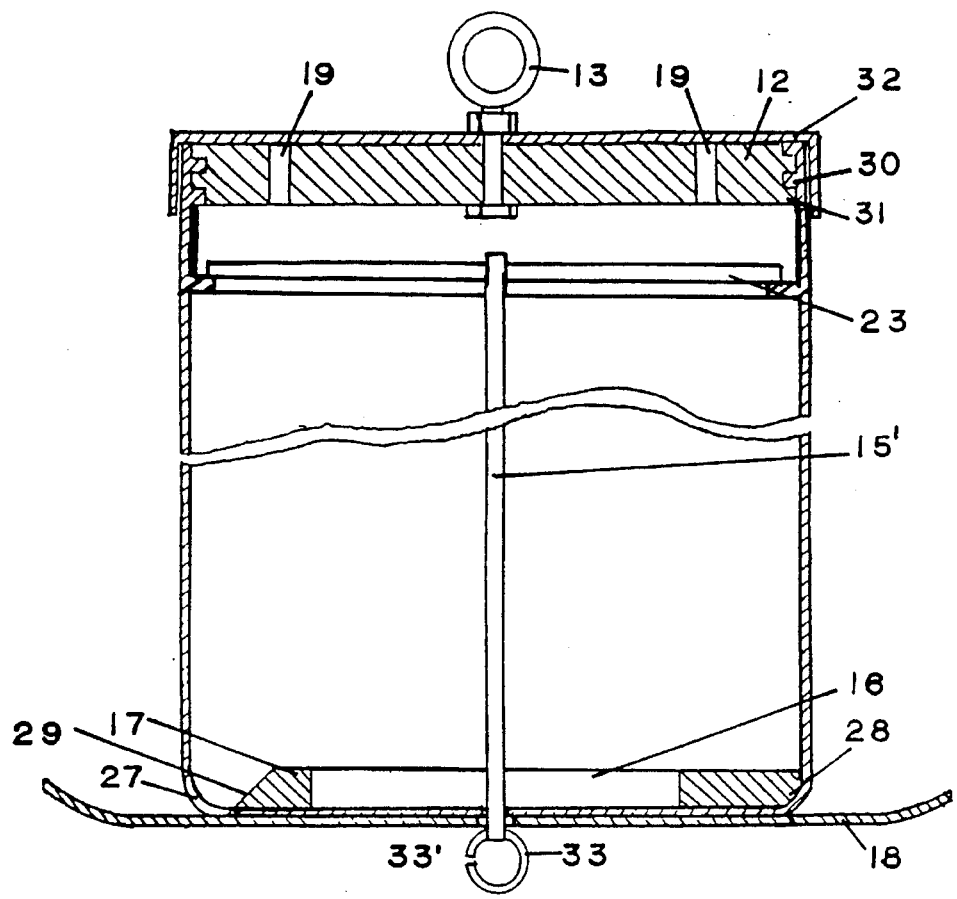
FIG. 2 is a cross-sectional elevation of another embodiment the invention showing the addition of lid 32 and substitution of a continuous-band coupling cord with elimination of clip 24.
Figure 3:
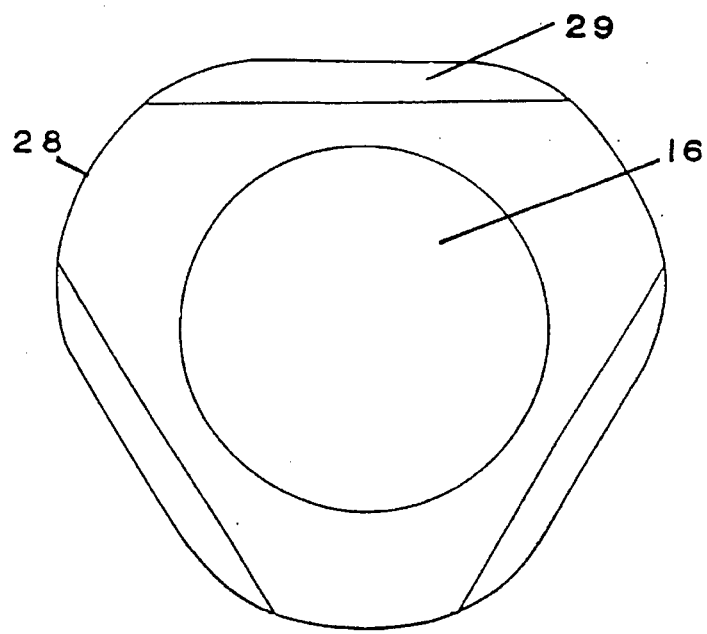
FIG. 3 is a top plan view of the embodiment of FIG. 1 with the cap removed showing an insert in the feed chamber for use in restricting feed port size.

Internal thread 30 of container 11 is engaged with complementary thread 31 of cap 12. If desired, the thread arrangement can be reversed with the outer surface of container 11 being threaded. In the embodiment of FIG. 2, lid 32 is provided as a weather shield over the top of container 11 and cap 12, but is eliminated when feeder 10 is affixed by cap 12 directly to an eave soffit or ceiling.

It will be apparent to a person skilled in the art that modifications of the disclosed feeder can be made without departing from the spirit of the invention, and the scope of the invention is limited only by the claims.

I claim:

1. A wild-bird feeder comprising in combination,
   a) an axially vertical tubular body configured with a smooth outside wall and a bottom wall,
   b) a removable cap for said tubular body,
   c) at least one feed port opening in said tubular body, said at least one opening located with at least a portion of a lip of said at least one opening disposed in said bottom wall of said tubular body,
   d) at least one elastic band supported at its upper end within the confine of said tubular body and with its lower extremity portion passed through said bottom wall,
   e) a perch underlying said tubular body wherein at least a portion of said perch extends radially beyond said outside wall, said perch being affixed to said lower extremity portion of said at least one elastic band whereby said perch is caused to be upset when a weight in excess of that of song birds is applied to the peripheral extremity of said perch.

2. The feeder of claim 1 wherein said cap is threadedly engaged with said tubular body.

3. The feeder of claim 1 comprising in addition a lid covering said body and said cap.

4. The feeder of claim 1 wherein said at least one elastic band is not isolated from feed contained in said body.

5. The feeder of claim 1 wherein the elastic constant of said at least one elastic band is not less than about one-fourth of the weight of a squirrel per inch of elongation at the extremity of said lower portion of said cord.

\* \* \* \* \*